US007031262B2

(12) United States Patent
Vasseur et al.

(10) Patent No.: US 7,031,262 B2
(45) Date of Patent: Apr. 18, 2006

(54) REOPTIMIZATION TRIGGERING BY PATH COMPUTATION ELEMENTS

(75) Inventors: Jean Philippe Vasseur, Dunstable, MA (US); David Ward, Somerset, WI (US); Muthurajah Sivabalan, Kanata (CA); Robert Goguen, Acton, MA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 10/848,744

(22) Filed: May 19, 2004

(65) Prior Publication Data

US 2005/0259664 A1    Nov. 24, 2005

(51) Int. Cl.
*H04L 12/26* (2006.01)
(52) U.S. Cl. ..................... 370/248; 370/238
(58) Field of Classification Search ............ 370/216, 370/225, 227–229, 231, 232, 235–238, 253, 370/254, 351, 431, 395.41, 395.42, 395.4, 370/242, 248; 709/239, 241, 104, 235
See application file for complete search history.

(56) References Cited

U.S. PATENT DOCUMENTS

| | | | | |
|---|---|---|---|---|
| 5,748,611 A | * | 5/1998 | Allen et al. .................. | 370/221 |
| 2002/0049849 A1 | * | 4/2002 | Proidl ......................... | 709/227 |
| 2002/0186658 A1 | * | 12/2002 | Chiu et al. ................... | 370/237 |

OTHER PUBLICATIONS

Awduche et al., "Requirements for Traffic Engineering Over MPLS, "RFC 2702, Internet Engineering Task Force, Sep. 1999.

Berger et al., "Generalized MPLS Signaling—RSVP-TE Extensions," RFC 3473, Internet Engineer Task Force, Jan. 2003.
Braden et al., "Resource ReSerVation Protocol (RSVP)—Version 1 Functional Specification," RFC 2205, Internet Engineering Task Force, Sep. 1997.
Lindem et al., "Extensions to OSPF for Advertising Optional Router Capabilities," Internet Draft, Internet Engineering Task Force, Oct. 2003.
Rosen et al., "Multiprotocol Label Switching Architecture," RFC 3031, Internet Engineering Task Force, Jan. 2001.
Vasseur et al., "RSVP Path Computation Request and Reply Messages," Internet Draft, Internet Engineering Task Force, Jun. 2002.

(Continued)

*Primary Examiner*—Brenda Pham
(74) *Attorney, Agent, or Firm*—Cindy Kaplan (57) ABSTRACT

A mechanism to alleviate bandwidth fragmentation in a network employing path computation element(s) to place MPLS Traffic Engineering tunnels. One application is a multiple Autonomous System or multiple area network employing distributed computation of MPLS Traffic Engineering LSPs. A particular path computation element may determine that bandwidth fragmentation is present based on monitoring of path computation failures where desired paths are blocked due to bandwidth constraints. In response to the detected bandwidth fragmentation condition, the path computation element floods a routing notification within its Autonomous System or area. Nodes respond to the routing notification by requesting reoptimization of their own previously requested Traffic Engineering LSPs allowing the path computation element an opportunity to alleviate bandwidth fragmentation.

18 Claims, 5 Drawing Sheets

OTHER PUBLICATIONS

Vasseur et al., "OSPF Traffic Engineering Capability TLVs," Internet Draft, Internet Egineering Task Force, Feb. 2003.

Vasseur et al., "Inter-AS MPLS Traffic Engineering," Internet Draft, Internet Engineering Task Force, Feb. 2003.

Vasseur et al., "OSPF MPLS Traffic Engineering Capabilities," Internet Draft, Internet Engineering Task Force, Feb. 2004.

Vasseur et al., "IS-IS MPLS Traffic Engineering Capabilities," Internet Draft, Internet Engineering Task Force, Feb. 2004.

* cited by examiner

REOPTIMIZATION TRIGGERING BY PATH COMPUTATION ELEMENTS

STATEMENT OF RELATED APPLICATIONS

The present application is related to the subject matter of U.S. patent application Ser. No. 10/767,574, entitled "COMPUTING INTER-AUTONOMOUS SYSTEM MPLS TRAFFIC ENGINEERING LSP PATHS," and filed on Jan. 29, 2004, the contents of which is incorporated herein by reference in its entirety for all purposes.

BACKGROUND OF THE INVENTION

The present invention relates to data networking and more particularly to path computation in certain types of situation.

MPLS (Multi-Protocol Label Switching) Traffic Engineering has been developed to meet data networking requirements such as guaranteed available bandwidth. MPLS Traffic Engineering exploits modern label switching techniques to build guaranteed bandwidth end-to-end tunnels through an IP/MPLS network of labels switched routers (LSRs). These tunnels are a type of label switched path (LSP) and thus are generally referred to as MPLS Traffic Engineering LSPs.

Establishment of an MPLS Traffic Engineering LSP from an LSP head-end to an LSP tail-end involves computation of a path through the network of LSRs. Optimally, the computed path is the "shortest" path, as measured in some metric, that satisfies all of the relevant constraints such as e.g., required bandwidth, affinities, etc. Path computation can either be performed by the head-end LSR or by some other entity operating as a path computation element (PCE). The head-end or PCE exploits its knowledge of network topology and resources available on each link to perform the path computation according to the LSP Traffic Engineering constraints. Various path computation methodologies are available including CSPF (constrained shortest path first).

Path computation for MPLS Traffic Engineering LSPs is a non-trivial problem given that such LSPs have bandwidth requirements among other constraints and the links of the network have limited bandwidth capacities and specific characteristics. When a head-end or PCE attempts to place a Traffic Engineering LSP, it takes into account the LSP's bandwidth requirements and other constraints and assures that those constraints are satisfied along the path (e.g., there is sufficient capacity along every link of the placed path). If the LSP is successfully placed its bandwidth requirements are subtracted from the capacity on all of the constituent links. However, in certain situations there is no placement that will satisfy the Traffic Engineering LSP's bandwidth requirements.

In many networks, path computation is accomplished in a distributed fashion. Although a path computation element may perform all path computations for a given Autonomous System or area, it may operate only at the request of LSP head-ends. Furthermore, path computation elements usually do not retain state information for previously placed paths. An undesirable bandwidth fragmentation condition can arise since the path computation elements are not free to perform a simultaneous recomputation of the LSP paths. When bandwidth is excessively fragmented, there may theoretically be sufficient resources to meet all requirements but the inability to coordinate allocations leads to fragmentation of resources such that some requirements cannot in fact be accommodated.

Figure 1:
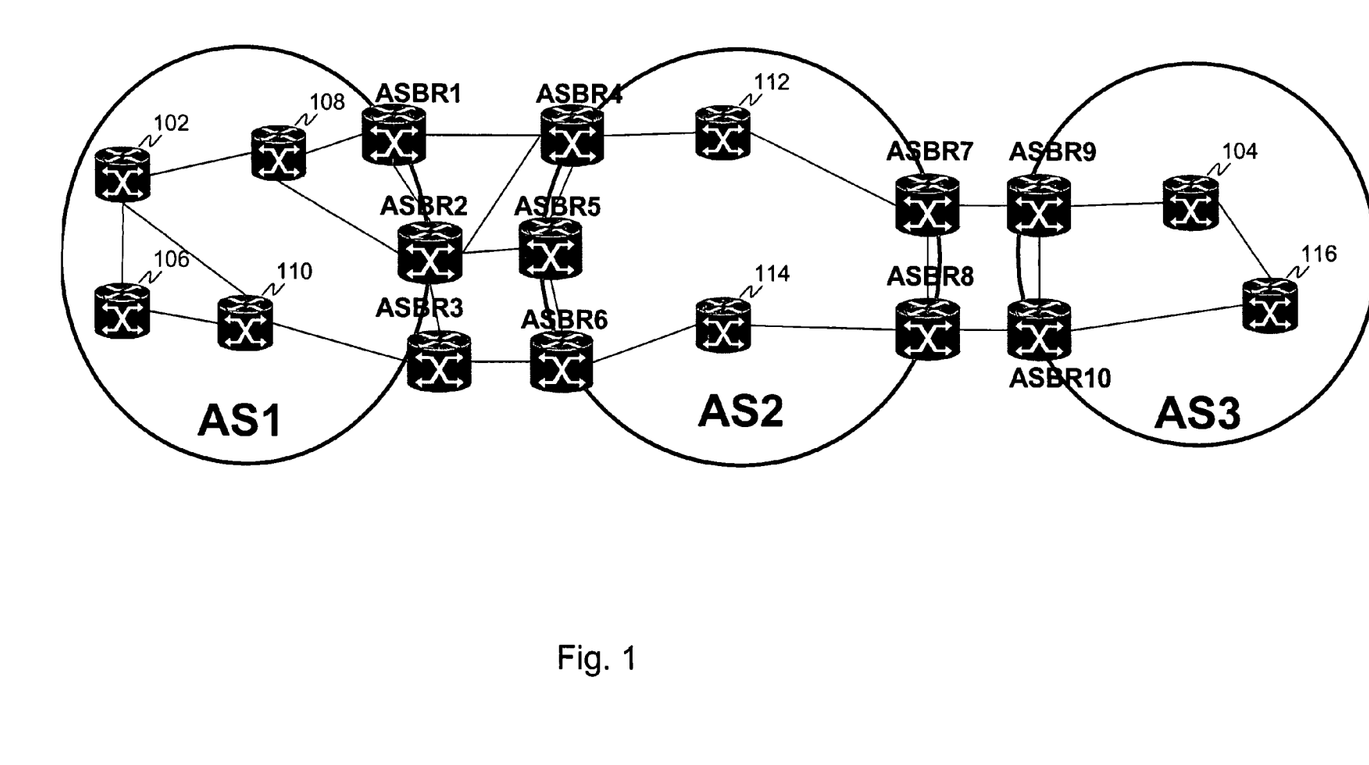
FIG. 1 depicts a multiple Autonomous Systems network to which embodiments of the present invention may be applied.

The bandwidth fragmentation problem can be readily understood with reference to a simple example. FIG. 1 depicts a multiple Autonomous System network scenario with three Autonomous Systems, AS1, AS2, and AS3. Each link among the nodes of these three Autonomous Systems has 10 Mbps of capacity. Now assume that ASBR1 operating as a path computation element places a 3 Mbps MPLS Traffic Engineering LSP from node 108 to node 104 by traversing ASBR1, ASBR4, node 112, ASBR7, and ASBR9. Some time after this placement, node 110 requests ASBR1 to place a 3 Mbps LSP from node 110 to node 116. ASBR1 places this LSP to traverse ASBR3, ASBR6, node 114, ASBR8, and ASBR10. After these two LSPs are placed, node 102 requests ASBR1 to place an 8 Mbps LSP from node 102 to node 104.

This will not be possible because the two 3 Mbps LSPs have taken up enough bandwidth on every conceivable route between node 102 and node 104 to block placement of the 8 Mbps LSP. Network resources in fact exist to support all three LSPs because the originally placed 3 Mbps LSP could be rerouted to include nodes 108, ASBR2, ASBR5, ASBR6, node 114, ASBR8, ASBR10, node 116, and node 104. If the original LSP were rerouted in this way, capacity would be freed to allow the 8 Mbps LSP to be placed from node 102 to node 104 through node 108, ASBR1, ASBR4, node 112, ASBR7, and ASBR9, and node 104. Using currently available techniques, path computation element ASBR1 is unable to bring this situation about.

One partial solution to bandwidth fragmentation is to assign priorities to Traffic Engineering LSPs such that a request to establish a higher priority LSP can cause a lower priority LSP to be preempted and torn down if necessary to free up bandwidth. The probability of a new Traffic Engineering LSP being blocked due to bandwidth fragmentation can be reduced by assigning higher priority to the Traffic Engineering LSPs having higher bandwidth. To avoid the disruption of an abrupt preemption, soft preemption techniques have been developed where the head end is given time to reroute the preempted LSP before it is torn down by an intermediate node. This is however not a complete solution since the feasible number of priority levels is limited and it is difficult to map Traffic Engineering LSP bandwidth requirements to priority levels. If this mapping is done statically it must be tailored to the distribution of MPLS Traffic Engineering bandwidth requirements and manually reconfigured when this distribution changes significantly. Performing the mapping automatically would be very complex.

Improved solutions to the problem of bandwidth fragmentation are needed.

SUMMARY OF THE INVENTION

Embodiments of the present invention provide a mechanism to alleviate bandwidth fragmentation in a network employing path computation element(s) to place MPLS Traffic Engineering tunnels. One application is a multiple Autonomous System or multiple area network employing distributed computation of MPLS Traffic Engineering LSPs. A particular path computation element may determine that bandwidth fragmentation is present based on monitoring of path computation failures where desired paths are blocked due to bandwidth constraints. In response to the detected bandwidth fragmentation condition, the path computation element floods a routing notification within its Autonomous System or area. Nodes respond to the routing notification by requesting reoptimization of their own previously requested Traffic Engineering LSPs allowing the path computation element an opportunity to alleviate bandwidth fragmentation.

A first aspect of the present invention provides a method of operating a path computation element. The method includes: determining that a fragmented bandwidth condition exists in a network and in response to the fragmented bandwidth condition, causing rerouting of MPLS Traffic Engineering paths to increase likelihood of successful placements.

A second aspect of the present invention provides a method of operating a path computation element to increase the likelihood of successful path placements. The method includes: distributing a reoptimization request to a plurality of nodes within the network, receiving requests for reoptimization of paths until a timer expires, and thereafter, recomputing the paths in response to the requests.

Further understanding of the nature and advantages of the inventions herein may be realized by reference to the remaining portions of the specification and the attached drawings.

DESCRIPTION OF SPECIFIC EMBODIMENTS

The present invention will be described with reference to a representative network environment and employs a certain combination of network protocols to forward data through the network. The links may be implemented using any type of physical medium such as, e.g., an optical medium, wireless medium, twisted pair, etc. Links may also be logical connections that give the connected nodes the property of adjacency in view of the operative networking protocols.

In one embodiment, the nodes of such a network interoperate in a manner specified by various protocols including, e.g., TCP/IP and protocols defined by, but not limited to, the following documents:

E. Rosen, et al., "Multiprotocol Label Switching Architecture," RFC 3031, Internet Engineering Task Force, January 2001.

Braden, et al. "Resource ReSerVation Protocol (RSVP)-Version 1 Functional Specification," RFC 2205, Internet Engineering Task Force, September 1997.

Awduche, et al., "Requirements for Traffic Engineering Over MPLS," RFC 2702, Internet Engineering Task Force, September 1999.

Berger, et al., "Generalized MPLS Signaling—RSVP-TE Extensions," RFC 3473, Internet Engineering Task Force, January 2003.

Vasseur, et al. "RSVP Path Computation Request and Reply Messages," Internet Draft, Internet Engineering Task Force, June 2002.

Lindem, et al., "Extensions to OSPF for Advertising Optional Router Capabilities," Internet Draft, Internet Engineering Task Force, October 2003.

Vasseur, et al., "OSPF Traffic Engineering Capability TLVs," Internet Draft, Internet Engineering Task Force, October 2002.

Vasseur, et al., "Inter-AS MPLS Traffic Engineering," Internet Draft, Internet Engineering Task Force, February 2003.

Vasseur, et al., "OSPF MPLS Traffic Engineering Capabilities," Internet Draft, Internet Engineering Task Force, February 2004.

Vasseur, et al., "IS-IS MPLS Traffic Engineering Capabilities," Internet Draft, Internet Engineering Task Force, February 2004.

The above documents are incorporated herein by reference in their entirety for all purposes.

In one embodiment, the nodes of example networks described herein are IP routers that implement multiprotocol label switching (MPLS) and operate as label switched routers (LSRs). In one simple MPLS scenario, at the ingress to the network, a label is assigned to each incoming packet based on its forwarding equivalence class before forwarding the packet to the next hop node. At each intermediate node, a forwarding selection and a new substitute label are determined by using the label found in the incoming packet as a reference to a label forwarding table that includes this information. At the network egress (or one hop prior), a forwarding decision is made based on the incoming label but optionally no label is included when the packet is sent on to the next hop.

The paths taken by packets that traverse the network in this manner are preconfigured and referred to as label switched paths (LSPs). Establishment of an LSP requires computation of a path, signaling along the path, and modification of forwarding tables along the path. MPLS Traffic Engineering establishes LSPs that have guaranteed bandwidth under certain conditions.

Embodiments of the present invention provide solutions to the problem of bandwidth fragmentation. Example scenarios will be discussed in which bandwidth defragmentation can be applied to networks incorporating multiple Autonomous Systems or multiple areas. The present invention will also find application in certain intra-area situations. The term "Autonomous System" generally refers to a group of routers within a network that are subject to a common authority and use the same intradomain routing protocol. The term "area" generally refers to a collection of routers that share full network topology information with each other but not necessarily with routers outside the area even those with which they share common administrative control. The term "area" as used herein also encompasses the term "level" which has a similar meaning for networks that employ IS-IS as their IGP (interior gateway protocol).

FIG. 1 depicts a multiple Autonomous System network to which embodiments of the present invention may be applied. There are three Autonomous Systems, AS1, AS2, and AS3. FIG. 1 shows 8 border routers positioned to connect the Autonomous Systems: ABR1, ABR2, ... ABR8. Additionally, FIG. 1 shows AS1 as including routers 102, 106, 108, and 110, AS2 as including routers 112 and 114, and AS3 as including router 104 and 116.

All of the border routers are typically BGP (Border Gateway Protocol) peers. The protocols used for routing within an AS (e.g., an IGP), do not operate on the links connecting the border routers. Within an AS, an IGP protocol such as the well-known IS—IS protocol or OSPF operates. ASBR1, ASBR8, and ASBR9 operate as path computation elements for their respective Autonomous Systems.

Figure 2:
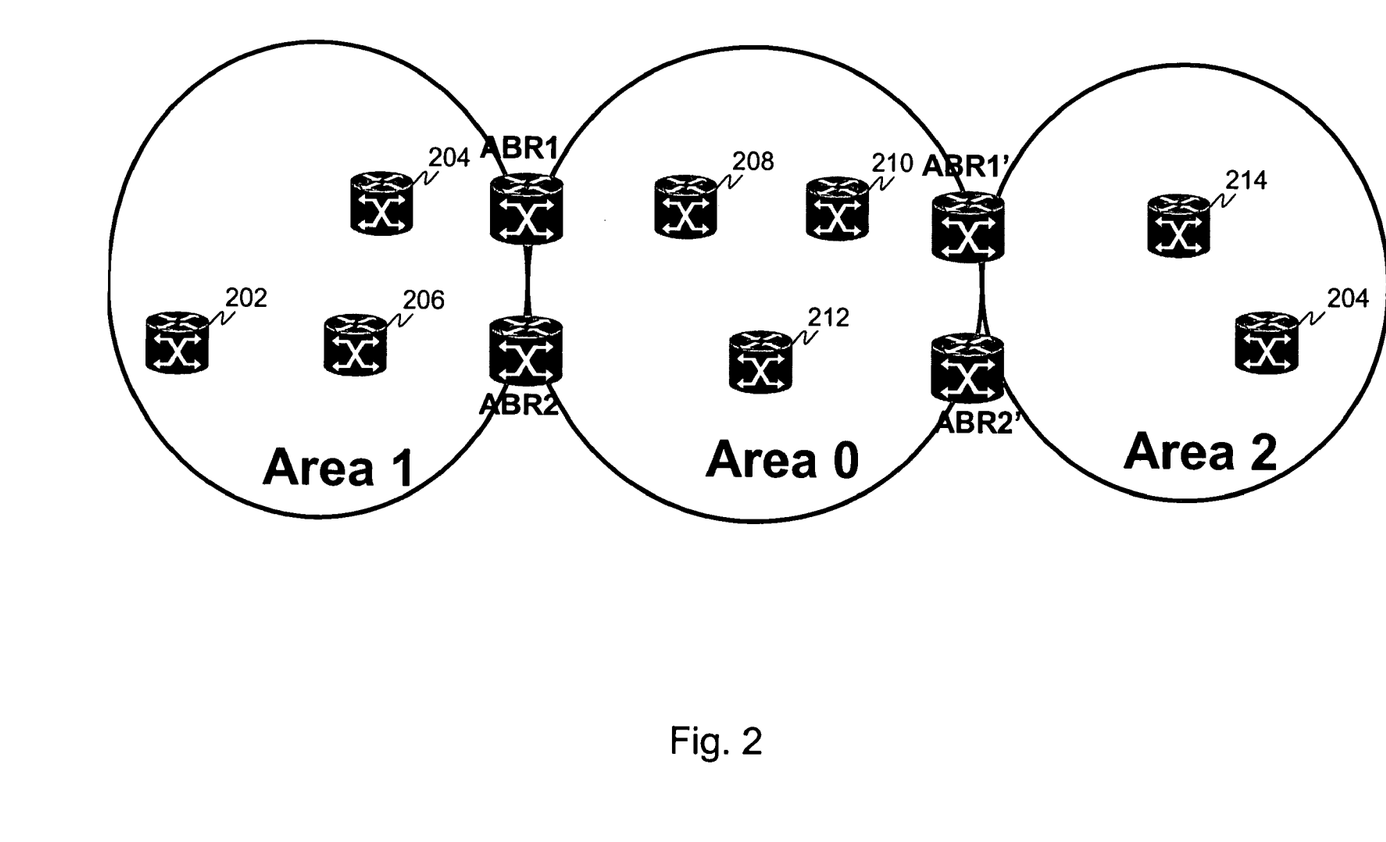
FIG. 2 depicts a multiple area network to which embodiments of the present invention may be applied.

FIG. 2 depicts a multiple area network to which embodiments of the present invention may be applied. There are three areas, Area 1, Area 0, and Area 2. Area border routers ABR1 and ABR2 interconnect Area 1 and Area 0. Area border routers ABR1' and ABR2' interconnect Area 0 and Area 2. Area 1 further includes routers 202, 204 and 206. Area 0 further includes routers 208, 210, and 212. Area 2 further includes router 204 and 214.

Computation of MPLS Traffic Engineering LSPs across multiple Autonomous Systems or areas is described in detail in U.S. application Ser. No. 10/767,574, filed Jan. 29, 2004. In the schemes described therein there is at least one path computation element per area or Autonomous System. A recursive backward path computation is used with multiple path computation elements participating in developing a virtual shortest path tree (VSPT). The path computation elements do not typically maintain state for the LSPs that they place. Further details of these techniques will be presented below. It will be appreciated, however, that the improvements in network resource utilization and bandwidth defragmentation provided by the present invention are not limited in application to multiple Autonomous System or multiple area networks.

The general mode of operation of a path computation element is to service requests for placements of MPLS Traffic Engineering LSPs from nodes within the same area or Autonomous System and from other path computation elements. Servicing such requests may involve cooperation with other path computation elements. Further details of these operations are found in U.S. application Ser. No. 10/767,574, filed Jan. 29, 2004 and are also presented below for ease of reference.

Figure 3:
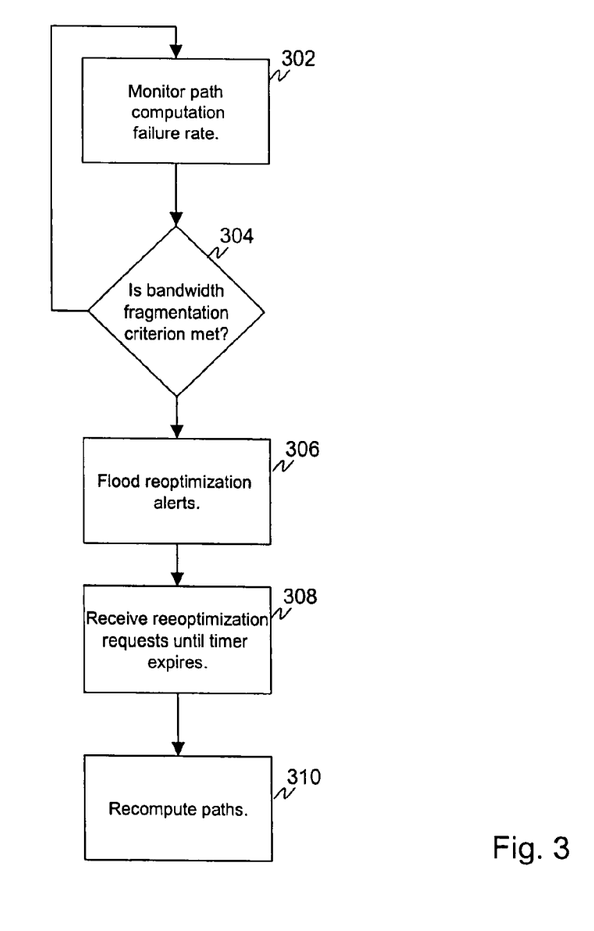
FIG. 3 is a flowchart describing steps of alleviating bandwidth fragmentation and/or improving use of network resources according to one embodiment of the present invention.

FIG. 3 is a flowchart describing steps of alleviating bandwidth fragmentation and/or improving use of network resources according to one embodiment of the present invention. The steps of FIG. 3 are generally performed at a particular path computation element in addition to general path computation operations. As a bandwidth fragmentation condition develops, the path computation element fails more frequently in its effort to place LSPs.

The failure of any particular path computation element may be, e.g., 1) a failure to fulfill a direct request from an LSP head-end or 2) a failure to fulfill the request of another path computation element to develop or extend a virtual shortest path tree used as an intermediate result in computing the overall shortest path. Note that either failure 1) or 2) may itself be a result of 2) occurring at another path computation element. Therefore, the failure to place a particular path may be recorded as a failure at two or more path computation elements.

At a step 302, the path computation element monitors its path computation failure rate. For example, this path computation failure rate may be estimated as a percentage of the attempted placements. Before further processing the failure rate may be subject to a moving average, low pass filter, etc. A step 304 compares the path computation failure rate measurements to some criterion. The criterion may be for example a configurable threshold set empirically so that fragmentation conditions are correctly identified.

If the fragmentation criterion is not met then processing returns to step 302 for further monitoring. If the fragmentation criterion is met then a reoptimization is initiated. In an alternative embodiment, reoptimization is initiated at regular intervals and failure rate is not measured. For example, reoptimization may occur at 3–4 AM every day. This type of periodic reoptimization will not work if the MPLS Traffic Engineering LSP bandwidths are adjusted automatically based on traffic conditions since the bandwidth values and fragmentation condition at any one time of day may not be representative of network conditions. Even if a failure rate measurement is used to determine when to reoptimize there may be a limit to how frequently reoptimization is permitted to occur.

At step 306, the path computation element floods its Autonomous System or area with special routing notifications to inform recipient nodes that they should request reoptimization of MPLS Traffic Engineering LSPs for which they previously requested placement from the path computation element. Although the path computation element is typically stateless and does not remember the Traffic Engineering LSPs it previously placed, the requesting head-end nodes will know which of their LSPs they requested from this path computation element. A routing notification may be in the form of a bit in a sub-TLV (tag length value) within a MPLS Traffic Engineering capabilities TLV found in a router capabilities message as defined by Vasseur, et al., "OSPF MPLS Traffic Engineering Capabilities," Internet Draft, Internet Engineering Task Force, February 2004 or Vasseur, et al., "IS-IS MPLS Traffic Engineering Capabilities," Internet Draft, Internet Engineering Task Force, February 2004. It should be noted that this flooding of routing notifications would be more efficient in terms of signaling overhead even if the path computation element retained state for previously placed MPLS Traffic Engineering LSPs.

At step 308, a node receiving the flooded routing notification responds by requesting recomputation of the paths of any MPLS Traffic Engineering LSPs that the node had established with the assistance of the path computation element sending the notification. The recomputation request may be made by use of the protocol specified in Vasseur, et al. "RSVP Path Computation Request and Reply Messages," Internet Draft, Internet Engineering Task Force, June 2002. The path computation element sets a timer after sending the routing notification to count down while replies are received. A timer value of e.g., 15–30 seconds, may be used depending on network size. This delays reoptimization until a maximum number of requests are received.

At step 310, following expiration of the timer, the path computation element recomputes the LSPs for which it has received requests. The computation exploits the virtual shortest path tree algorithm which is set forth below. To reduce fragmentation and increase the probability of successful placements, the LSPs are preferably placed in descending order of bandwidth. Details of path computation will be presented with reference to FIG. 4 for the multiple Autonomous System case and with reference to FIG. 5 for the multiple area case. Besides their relevance to reoptimization, these path computation details are also useful for providing context for understanding what events may be recorded as placement failures.

Figure 4:
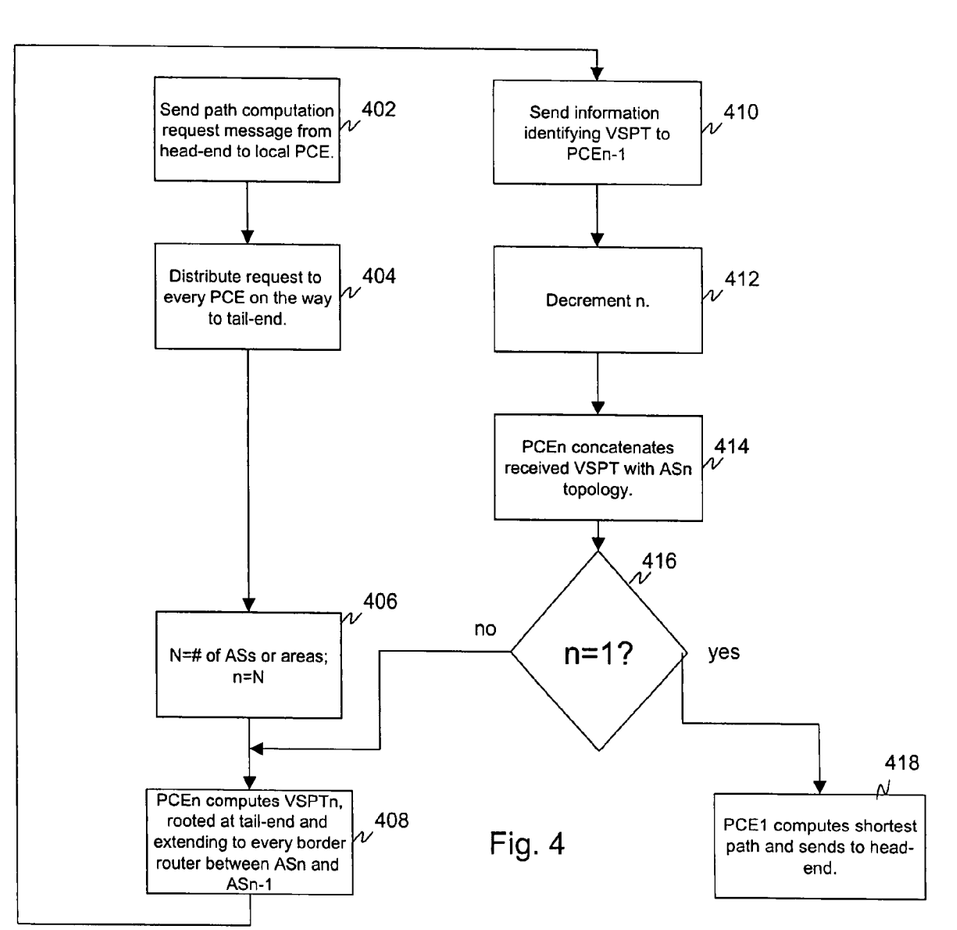
FIG. 4 is a flowchart describing steps of computing a path through a multiple Autonomous Systems network according to one embodiment of the present invention.

FIG. 4 is a flowchart describing steps of computing a path of an inter-Autonomous System MPLS Traffic Engineering LSP according to one embodiment of the present invention. For this case we assume a topology with n Autonomous Systems: AS1, AS2, AS3, . . . ASn. Each AS has a dedicated path computation element PCEi which can either be statically configured on the path computation clients or dynamically discovered by means of IGP extensions. Also, the border routers that interconnect each AS will be defined. An entry border router of ASi is a border router that connects ASi−1 to ASi. An exit border router of ASi is a border router that interconnects ASi to ASi+1.

For each ASi, we can define a set, X-en(i), of entry border routers identified as ASBR-en(k,i), the kth entry border router of ASi. Similarly, there is a set X-ex(i) of exit border routers identified as ASBR-ex(k,i), the kth exit border router of ASi.

At a step 402, a path computation request is sent from the LSP head-end (which is acting as a path computation client) to the local path computation element (PCE1). In the context of reoptimization this request is the reoptimization request transmitted during step 308 and includes an identification of the existing LSP. At step 404, the path computation request is passed to the path computation element in every Autonomous System on the way to the LSP tail-end. Knowledge of the other path computation element addresses may be by way of static configuration or BGP advertisements as could be readily devised by one of skill in the art. If N is the number of Autonomous Systems on the way to the LSP tail-end, one can say that the path computation request is ultimately received by a PCE-N in the Autonomous System of the tail-end.

A backward recursive path computation begins. A step 406 sets N to the number of Autonomous Systems and an index variable n is set equal to N. A step 408 is the first step inside the recursion loop. At step 408, PCEn computes VSPTn. VSPTn is a shortest path tree rooted at the LSP tail-end and includes a path from this tail-end to every ASBR-en(k,n). This may be computed using the CSPF (constrained shortest path first) algorithm as known in the art or any other suitable algorithm. If no paths are found for this VSPTn this is a failure that contributes to the failure rate for PCEn, PCE1, and all other path computation elements in between. In case of such a failure the procedure terminates with notification being sent to the original path computation element receiving the request. Links between entry border routers of ASn should be taken into account when computing VSPTn.

A step 410 sends information specifying VSPTn from PCEn to PCEn−1. The VSPT may or may not be specified in such a way that hops internal to an Autonomous System and their costs are specified. A step 412 decrements n.

At step 414, PCEn concatenates the VSPT it received from PCEn+1 with the topology of ASn. In one implementation, PCEn, before concatenating the ASn topology with VSPTn+1 may invoke a local CSPF algorithm on the interconnections between all ASBR-ex(k,i) and ASBR-en (k',i+1). A step 416 tests whether n equals 1, i.e., whether the algorithm is about to visit the path computation element in the Autonomous System of the LSP head-end (PCE1). If n does not equal 1, another iteration begins at step 408 with the computation of VSPTn.

If step 416 determines that n=1, then at step 218, PCE1 concatenates the received VSPT2 to the topology of AS1, computes (using, e.g., CSPF) the shortest path based on the concatenated topology, and then sends information specifying the shortest path to the requesting head-end. If multiple equal-cost paths are found, PCE1 may provide some or all of them to the requesting head-end. Other situations where PCE1 may return more than one path include, e.g., where the head-end requests the computation of N diverse paths. These diverse paths may or may not have equal costs. If no path is found, this is recorded as a failure by PCE1. The procedure of FIG. 4, and alternatives described in U.S. application Ser. No. 10/767,574, may be applied to inter-area scenarios.

Figure 5:
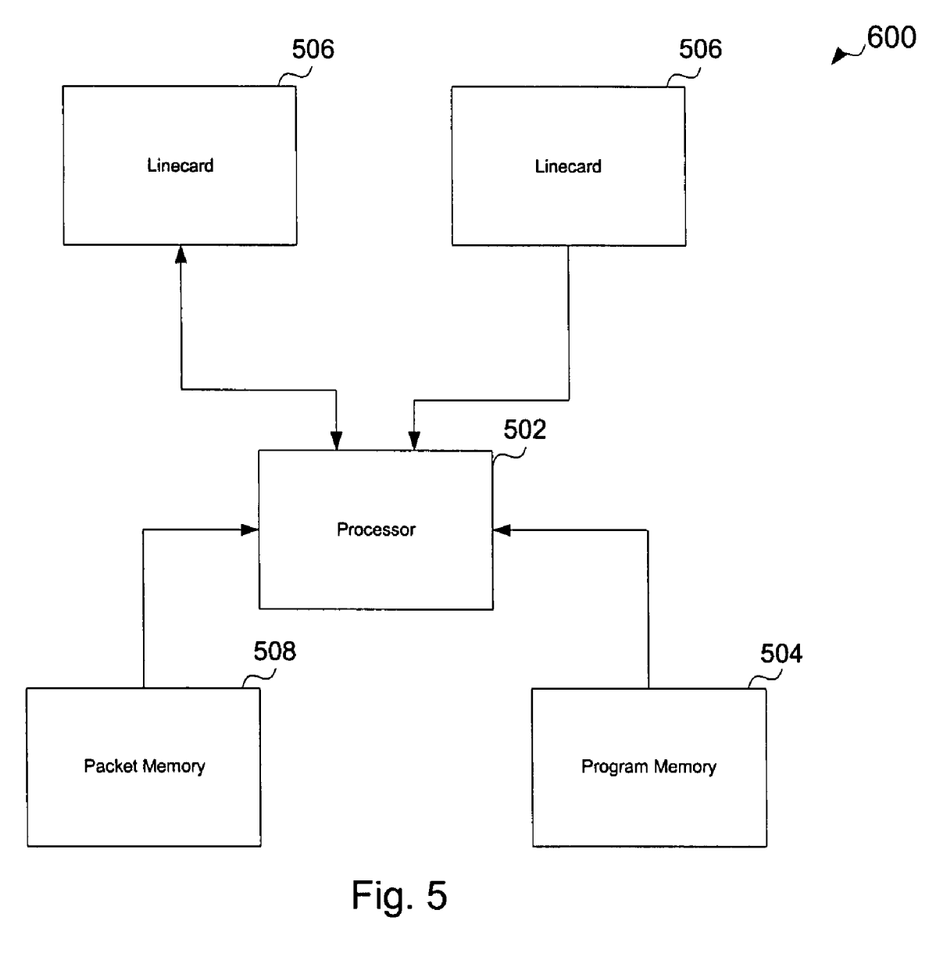
FIG. 5 is a flowchart describing steps of computing a path through a multiple area network according to one embodiment of the present invention.

FIG. 5 depicts a network device 500 that may be used to implement, e.g., any of the routers of FIGS. 1–2 and/or perform any of the steps of FIG. 3–4. In one embodiment, network device 500 is a programmable machine that may be implemented in hardware, software or any combination thereof. A processor 502 executes code stored in a program memory 504. Program memory 504 is one example of a computer-readable medium. Program memory 504 can be a volatile memory. Another form of computer-readable medium storing the same codes would be some type of non-volatile storage such as floppy disks, CD-ROMs, DVD-ROMs, hard disks, flash memory, etc. A carrier wave that carries the code across a network is another example of a computer-readable medium.

Network device 500 interfaces with physical media via a plurality of linecards 506. Linecards 506 may incorporate Ethernet interfaces, DSL interfaces, Gigabit Ethernet interfaces, 10-Gigabit Ethernet interfaces, SONET interfaces, etc. As packets are received, processed, and forwarded by network device 500, they may be stored in a packet memory 508. Network device 500 implements all of the network protocols and extensions thereof described above as well as the data networking features provided by the present invention.

In one implementation, control plane operations such as the path computation operations described above are controlled and signaled by processor 502 while forwarding tables are maintained on linecards 506. The present invention is, however, not limited to a distributed architecture. To implement functionality according to the present invention, linecards 506 may incorporate processing and memory resources similar to those discussed above in connection with the network device as a whole.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents. For example, the present invention can be applied to Traffic Engineering LSPs that do not traverse multiple Autonomous Systems or areas.

The invention claimed is:

1. A method of operating a path computation element, said method comprising:
   determining that a fragmented bandwidth condition exists in a network; and
   in response to said fragmented bandwidth condition, causing rerouting of MPLS Traffic Engineering paths to increase likelihood of successful placements;
   wherein determining that a fragmented bandwidth condition exists in a network comprises monitoring a failure rate in establishing paths and comparing results of said monitoring to a failure rate criterion.

2. A method of operating a path computation element, said method comprising:
   determining that a fragmented bandwidth condition exists in a network; and
   in response to said fragmented bandwidth condition, causing rerouting of MPLS Traffic Engineering paths to increase likelihood of successful placements;
   wherein rerouting comprises receiving requests for reoptimization of paths until a timer expires; thereafter recomputing said paths in response to said requests.

3. The method of claim 2 wherein causing rerouting comprises:

distributing a reoptimization request to a plurality of nodes within said network.

4. The method of claim 2 wherein recomputing comprises:
recomputing employing a virtual shortest path tree technique.

5. The method of claim 2 wherein recomputing comprises:
recomputing said paths in order of decreasing bandwidth requirements.

6. A method of operating a path computation element to increase the likelihood of successful path placements, said method comprising:
distributing a reoptimization request to a plurality of nodes within said network;
receiving requests for reoptimization of paths until a timer expires; and thereafter
recomputing said paths in response to said requests;
wherein recomputing comprises: recomputing employing a virtual shortest path tree technique.

7. A method of operating a path computation element to increase the likelihood of successful path placements, said method comprising:
distributing a reoptimization request to a plurality of nodes within said network;
receiving requests for reoptimization of paths until a timer expires; and thereafter
recomputing said paths in response to said requests;
wherein recomputing comprises: recomputing said paths in order of decreasing bandwidth requirements.

8. A computer program product for operating a path computation element, said computer program product comprising:
code that causes a determination that a fragmented bandwidth condition exists in a network;
code that, in response to said fragmented bandwidth condition, causes rerouting of MPLS Traffic Engineering paths to increase likelihood of successful placements; and
a computer-readable medium that holds the codes;
wherein said code that causes determination of a fragmented bandwidth condition comprises code that causes monitoring of a failure rate in establishing paths and code that causes comparison of results of said monitoring to a failure rate criterion.

9. A computer program product for operating a path computation element, said computer program product comprising:
code that causes a determination that a fragmented bandwidth condition exists in a network,
code that, in response to said fragmented bandwidth condition, causes rerouting of MPLS Traffic Engineering paths to increase likelihood of successful placements; and
a computer-readable medium that holds the codes;
wherein said code that causes rerouting comprises:
code that causes receipt of requests for reoptimization of paths until a timer expires; and
code that causes recomputation of said paths in response to said requests.

10. The computer program product of claim 9 wherein said code that causes rerouting comprises:
code that causes distribution of a reoptimization request to a plurality of nodes within said network.

11. The computer program product of claim 9 wherein said code that causes recomputation of said paths comprises:

code that causes recomputation of said paths by employing a virtual shortest path tree technique.

12. The computer program product of claim 11 wherein said code that causes recomputation comprises:
code that causes recomputation of said paths in order of decreasing bandwidth requirements.

13. A computer program product for operating a path computation element to increase the likelihood of successful path placements, said computer program product comprising:
code that causes distribution of a reoptimization request to a plurality of nodes within said network;
code that causes reception of requests for reoptimization of paths until a timer expires;
code that causes recomputation of said paths in response to said requests; and
a computer-readable medium that holds the codes;
wherein said code that causes recomputation of paths comprises: code that causes recomputation employing a virtual shortest path tree technique.

14. A computer program product for operating a path computation element to increase the likelihood of successful path placements, said computer program product comprising:
code that causes distribution of a reoptimization request to a plurality of nodes within said network;
code that causes reception of requests for reoptimization of paths until a timer expires;
code that causes recomputation of said paths in response to said requests; and
a computer-readable medium that holds the codes;
wherein said code that causes recomputation comprises: code that causes recomputation of said paths in order of decreasing bandwidth requirements.

15. Apparatus for operating a path computation element, said apparatus comprising:
a processor;
a memory device that stores instructions for execution by said processor, said instructions comprising:
code that causes a determination that a fragmented bandwidth condition exists in a network; and
code that, in response to said fragmented bandwidth condition, causes rerouting of MPLS Traffic Engineering paths to increase likelihood of successful placements;
wherein said code that causes rerouting comprises:
code that causes receipt of requests for reoptimization of paths until a timer expires; and
code that causes recomputation of said paths in response to said requests.

16. Apparatus for operating a path computation element to increase the likelihood of successful path placements, said apparatus comprising:
a processor;
a memory device that stores instructions for execution by said processor, said instructions comprising:
code that causes distribution of a reoptimization request to a plurality of nodes within said network;
code that causes reception of requests for reoptimization of paths until a timer expires; and
code that causes recomputation of said paths in response to said requests wherein code that causes recomputation of said paths comprises code that causes recomputation employing a virtual shortest path tree technique.

17. Apparatus for operating a path computation element, said method comprising:
- means for determining that a fragmented bandwidth condition exists in a network; and
- means for, in response to said fragmented bandwidth condition, causing rerouting of MPLS Traffic Engineering paths to increase likelihood of successful placements;
- wherein said means for causing rerouting comprises receiving requests for reoptimization of paths until a timer expires; thereafter
- recomputing said paths in response to said requests.

18. Apparatus for operating a path computation element to increase the likelihood of successful path placements, said apparatus comprising:
- means for distributing a reoptimization request to a plurality of nodes within said network;
- means for receiving requests for reoptimization of paths until a timer expires; and thereafter
- means for recomputing said paths in response to said requests, wherein recomputing comprises: recomputing employing a virtual shortest path tree technique.

* * * * *